(12) United States Patent
Yang et al.

(10) Patent No.: US 8,115,868 B2
(45) Date of Patent: Feb. 14, 2012

(54) DATA RECOVERY DEVICE AND DATA RECOVERY METHOD FOR TELEVISION SIGNALS

(75) Inventors: Yi-Le Yang, Hsinchu (TW); Ming-Feng Chou, Jhubei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1435 days.

(21) Appl. No.: 11/521,367

(22) Filed: Sep. 15, 2006

(65) Prior Publication Data

US 2007/0064149 A1 Mar. 22, 2007

(30) Foreign Application Priority Data

Sep. 16, 2005 (TW) .............................. 94132138 A

(51) Int. Cl.
H04N 11/00 (2006.01)
H04N 7/00 (2006.01)
H04N 9/475 (2006.01)
H04N 5/00 (2006.01)
H03L 7/00 (2006.01)

(52) U.S. Cl. ........ 348/465; 348/468; 348/478; 348/512; 348/540; 348/607

(58) Field of Classification Search .................. 348/465, 348/468, 478, 512, 540, 607
See application file for complete search history.

(56) References Cited

U.S. PATENT DOCUMENTS

| | | | | |
|---|---|---|---|---|
| 4,667,235 A * | 5/1987 | Nozoe et al. | ................... | 348/464 |
| 5,483,289 A * | 1/1996 | Urade et al. | ................... | 348/468 |
| 5,486,865 A * | 1/1996 | James | ............................ | 348/465 |
| 5,555,025 A * | 9/1996 | McArthur | ...................... | 348/478 |
| 5,844,622 A * | 12/1998 | Hulvey | .......................... | 348/546 |
| 5,926,491 A * | 7/1999 | Cahill, III | ..................... | 714/798 |
| 6,130,718 A * | 10/2000 | Stumpf et al. | ................. | 348/465 |
| 6,239,843 B1 * | 5/2001 | Gaudreau | ...................... | 348/465 |
| 6,310,653 B1 * | 10/2001 | Malcolm et al. | .............. | 348/537 |
| 6,377,308 B1 * | 4/2002 | Cahill, III | ..................... | 348/461 |
| 6,377,311 B1 * | 4/2002 | Erbar et al. | .................... | 348/607 |
| 6,381,287 B1 | 4/2002 | Shin | | |
| 6,449,016 B1 * | 9/2002 | Glassner et al. | .............. | 348/465 |
| 6,499,016 B1 * | 12/2002 | Anderson | ...................... | 704/275 |
| 6,507,369 B1 * | 1/2003 | Kim | ................................. | 348/465 |
| 6,741,291 B1 * | 5/2004 | Tsubaki | ......................... | 348/533 |
| 6,784,943 B1 * | 8/2004 | Tults | .............................. | 348/465 |
| 6,789,124 B1 * | 9/2004 | Nasuti et al. | ................... | 709/236 |
| 6,839,091 B1 * | 1/2005 | Hebbalalu et al. | ............ | 348/465 |
| 7,046,298 B2 * | 5/2006 | Kuzumoto et al. | ........... | 348/465 |
| 7,098,960 B2 * | 8/2006 | Suzuki et al. | ................. | 348/465 |
| 7,102,689 B2 * | 9/2006 | Grossman et al. | ............ | 348/465 |
| 7,327,399 B2 * | 2/2008 | O'Connell | ..................... | 348/465 |
| 7,663,697 B2 * | 2/2010 | Nash | .............................. | 348/500 |
| 2002/0008776 A1 * | 1/2002 | Kuzumoto et al. | ........... | 348/468 |
| 2003/0048386 A1 * | 3/2003 | Zeidler | .......................... | 348/691 |
| 2005/0195326 A1 * | 9/2005 | Kudou | ............................ | 348/465 |
| 2006/0170661 A1 * | 8/2006 | Clynes et al. | .................. | 345/204 |
| 2006/0176395 A1 * | 8/2006 | Shin et al. | ..................... | 348/468 |
| 2007/0064149 A1 * | 3/2007 | Yang et al. | ..................... | 348/465 |

* cited by examiner

Primary Examiner — Brian Yenke
(74) Attorney, Agent, or Firm — Thomas, Kayden, Horstemeyer & Risley, LLP

(57) ABSTRACT

A data recovery device and a method thereof for processing a television signal having a plurality of horizontal scan signals are disclosed. The data recovery device includes a reference level processing unit and a data processing circuit. The method for data recovery is by means of the reference level processing unit to generate a plurality of reference levels according to a reference component of each of the horizontal scan signals. And the data processing circuit is used to process the N+1th horizontal scan signal in accordance with the Nth reference level.

20 Claims, 4 Drawing Sheets

| Standard of TV | Types of VBI | serial numbers of horizontal scan signal |
|---|---|---|
| NTSC | CC | 21、22、23 |
| | CGMS | 20、283 |
| PAL | WSS | 23 |
| | VPS | 16、239 |
| | TTX | 6~23、318~335 |

Fig. 3

DATA RECOVERY DEVICE AND DATA RECOVERY METHOD FOR TELEVISION SIGNALS

BACKGROUND OF THE INVENTION

The present invention relates to a data recovery device and a method thereof, especially to a data recovery device and a method thereof for processing television signals.

There are various types of the Vertical Blanking Interval (VBI) signal of television signals such as Closed Caption, Video Programming System, Widescreen Signaling, Copy Generation Management System or Teletext, etc. Due to the varieties of VBI signal, the VBI signal includes a reference component such as framing code for video devices to recognize the type of VBI signal for processing by means of a reference level.

However, most of video devices decide the type of the VBI signals by a fixed reference level. During the transmission process, the VBI signals are easily influenced by external interference. Thus if the video devices uses the predetermining fixed reference level, the types of television signals cannot be checked correctly.

SUMMARY OF THE INVENTION

One object of the present invention is to provide a data recovery device and a method thereof that utilizing the reference component of one horizontal scan signal to determine the signal type and processing method of next horizontal scan signal.

According to an embodiment of the present invention, a data recovery device and a method thereof applied to process a television signal is disclosed. The television signal has a plurality of horizontal scan signals. The data recovery device includes a reference level processing unit and a data processing circuit. The method for data recovery uses the reference level processing unit to generate a plurality of reference levels sequentially in accordance with the horizontal scan signals. And the data processing circuit is used to process the N+1th horizontal scan signal according to the Nth reference level. The data processing circuit is composed of a checking unit and a data processing unit. In accordance with the Nth reference level, the checking unit is used to check a reference component of the N+1th horizontal scan signal according to the Nth reference level for determining the type of the N+1th horizontal scan signal and generating a N+1th checking signal. And the data processing unit processes a data component of the N+1th horizontal scan signal according to the N+1 checking signal.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein
FIG. 3 is a comparison chart for various VBI signals and corresponding horizontal scan signals.

DETAILED DESCRIPTION OF THE PREFERRED EMBODIMENT

There are various types of VBI signals. In the following embodiments, a CGMS (Copy Generation Management System) signal is taking as an example.

Figure 1:
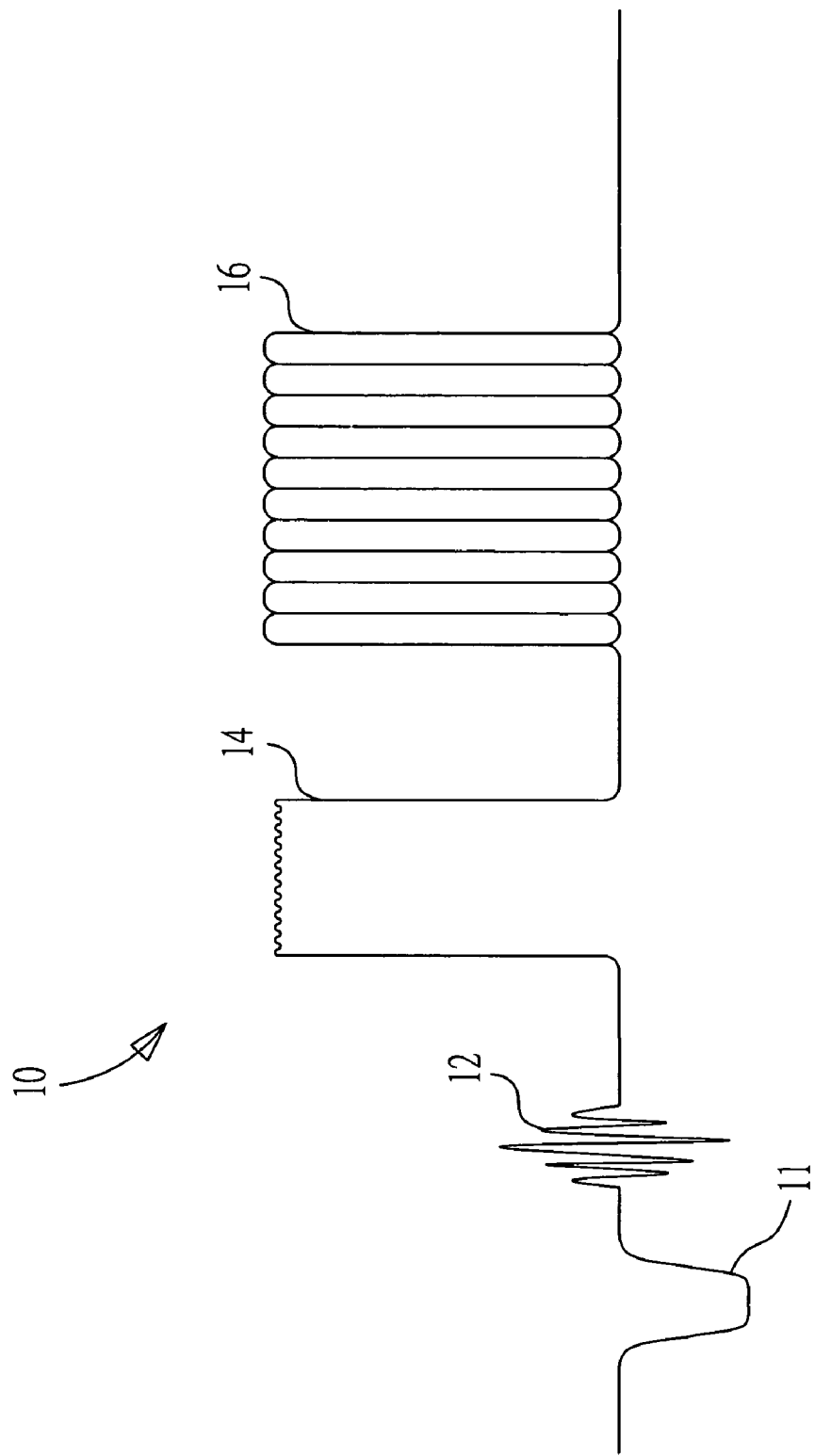
FIG. 1 is a timing diagram of a CGMS signal.

Refer to FIG. 1, a timing diagram of a CGMS signal is disclosed. The CGMS signal 10 includes a Horizontal Synchronous Signal 11, a Color Burst 12, a framing code 14 and a Data Component 16. The Color Burst 12 is used to adjust the color difference between images, the framing code 14 is used for video devices to recognize the CGMS signal 10, working as a reference component. The present invention calculates a reference level on the basis of the reference component. Please note that, as to the VBI signal with Clock Run-In Signal such as Teletext signal, the reference component for calculating the reference level means to calculate the reference level of the Clock Run-In Signal or the framing code 14.

Figure 2:
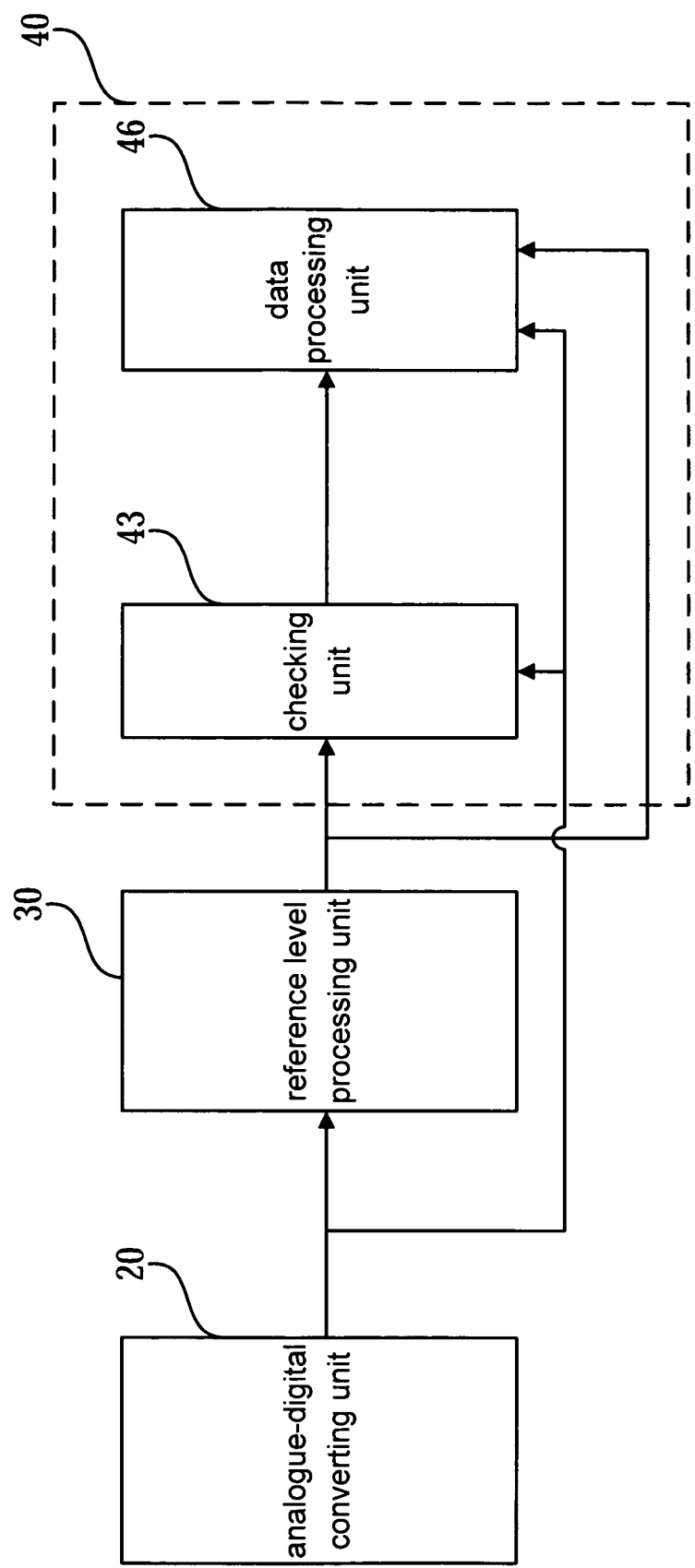
FIG. 2 is a schematic drawing of an embodiment in accordance with the present invention.

Refer to FIG. 2, a block diagram of an embodiment in accordance with the present invention is disclosed. As shown in FIG. 2, a data recovery device in accordance with the present invention consists of an analogue-digital converting unit 20, a reference level processing unit 30 and a data processing circuit 40. The analogue-digital converting unit 20 receives a plurality of horizontal scan signals included in a television signal and converts these signals into digitalized horizontal scan signals. The reference level processing unit 30 operates reference component of these digitalized horizontal scan signals. That means to process a plurality of framing code 14 shown in FIG. 1 to generate a plurality of reference levels, wherein each reference level is respectively corresponding to the framing code 14 of each digitalized horizontal scan signal. The reference level processing unit 30 can be an averaging filter, but not limited, and this application of averaging filter is learned by people in this field.

The data processing circuit 40 is used to process the N+1th horizontal scan signal according to the reference level of Nth horizontal scan signal, wherein N is an integer larger than 1 or equal to 1. The data processing circuit 40 consists of a checking unit 43 and a data processing unit 46. In accordance with the Nth reference level, the checking unit 43 decides a digital value of the framing code 14 of the N+1th horizontal scan signal, afterward determines the type of the N+1th horizontal scan signal depending on the digital value and generates a N+1th checking signal corresponding to the type of the N+1th horizontal scan signal. For example, check whether the N+1th horizontal scan signal is a Vertical Blanking Interval (VBI) signal or not. That means to check whether the N+1th horizontal scan signal corresponds to a VBI Type.

In accordance with the N+1th checking signal as well as the Nth reference level, the data processing unit 46 processes the data component 16 of the N+1th horizontal scan signal. That means to sample the data component 16 of the N+1th horizontal scan signal according to the type of the N+1th horizontal scan signal. As shown in FIG. 1, the Color Burst 12 is generated before the framing code 14 of the VBI signal and after the Horizontal Synchronous Signal 11. Therefore, in this embodiment, the reference level processing unit 30 properly delays a period of time to process the framing code 14 after receiving the Horizontal Synchronous Signal 11. For example, the reference level processing unit 30 delays some reference clock cycles so as to avoid the Color Burst 12, then performing calculations.

Refer to FIG. 2, when the reference level processing unit 30 processes the reference component of the first horizontal scan signal so as to generate a first reference level, the checking unit 43 decides the digital value corresponding to the reference component of the first horizontal scan signal according to a predetermining reference level, thus further checks the type of the first horizontal scan signal and generates a first checking signal. The data processing unit 46 processes the data component of the first horizontal scan signal according to the first checking signal and the predetermining reference level. Then the reference level processing unit 30 generates a second reference level in accordance with the reference component of a second horizontal scan signal. The checking unit 43 checks the type of the second horizontal scan signal according to the first reference level and generates a second checking signal. In accordance with the second checking signal and the first reference level, the data processing unit 46 processes the data component of the second horizontal scan signal. Similarly, the reference level processing unit 30 generates a N+1th reference level according to the reference component of the N+1th horizontal scan signal while the checking unit 43 checks the type of the N+1th horizontal scan signal in accordance with the Nth reference level and generates a N+1th checking signal. And the data processing unit 46 processes the data component of the N+1th horizontal scan signal in accordance with the N+1th checking signal and the Nth reference level.

When the above-mentioned reference level processing unit 30 processes the reference component of the first horizontal scan signal for generating the first reference level, the checking unit 43 and the data processing unit 46 process the first horizontal scan signal according to the predetermining reference level. It's also feasible of the present invention not to process the first horizontal scan signal according to the predetermining reference level. That means the checking unit 43 neither checks the first horizontal scan signal nor generates the first checking signal while the data processing unit 46 doesn't process the data component of the first horizontal scan signal. Only when the reference level processing unit 30 generates the second reference level on the basis of the second horizontal scan signal, the checking unit 43 checks the type of the second horizontal scan signal according to the first reference level and generates the second checking signal. And the data processing unit 46 processes the data component of the second horizontal scan signal in accordance with the second checking signal and the first reference level.

Figure 4:
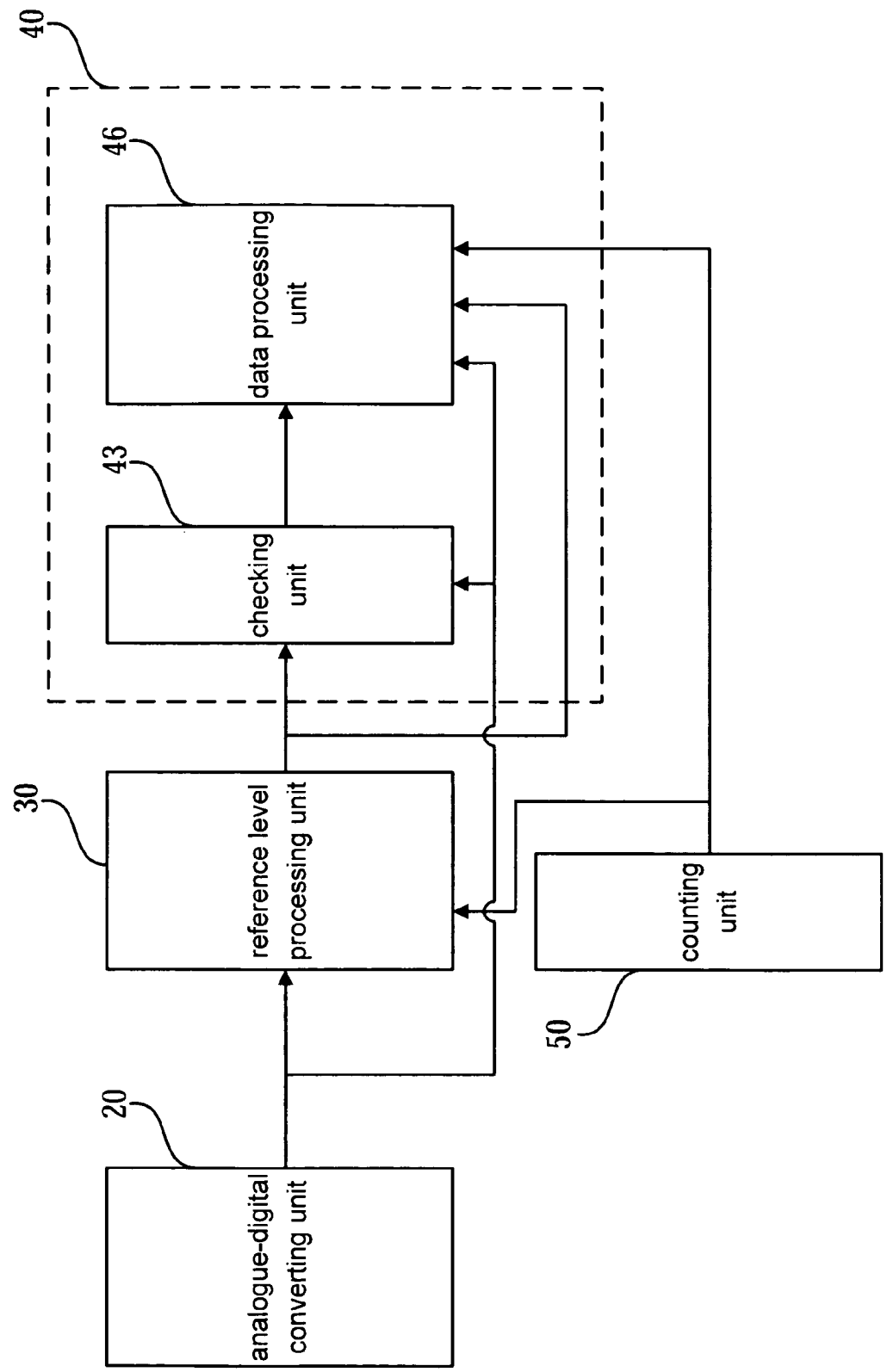
FIG. 4 is a schematic drawing of the second embodiment in accordance with the present invention.

Refer to FIG. 3, a comparison chart for various VBI signals and corresponding horizontal scan signals is disclosed. As shown in figure, in the specification of NTSC (National Television System Committee) and PAL (Phase Alternating Line), various types of VBI signals corresponds to a specific horizontal scan signal respectively. The CGMS signal 10 corresponds to the 20th horizontal scan signal and the 283th horizontal scan signal. If users intend to process a specific type of VBI signal, an embodiment added with a counting unit 50 in FIG. 4 is used. The counting unit 50 is used to count the horizontal scan signals so as to generate a plurality of counting signals. Thus the reference level processing unit 30 and the data processing unit 46 processes the specific horizontal scan signal in accordance with the counting signal and further deal with the specific type of VBI signal. The following takes the CGMS signal corresponding to the 20th and the 283th horizontal scan signals as an example.

When the counting unit 50 counts the 20th or the 283th horizontal scan signal, a counting signal is generated and is sent to the reference level processing unit 30 and the data processing unit 46. For the convenience of explanation, it is assumed that the counting unit 50 counts the 20th horizontal scan signal and sends a first counting signal to the reference level processing unit 30 and the data processing unit 46. According to the first counting signal, the reference level processing unit 30 processes the reference component of the digitalized 20th horizontal scan signal transmitted by the analogue-digital converting unit 20 and generates a reference level. The checking unit 43 checks whether the 20th horizontal scan signal is the CGMS signal 10 by means of the predetermining reference level and generates a checking signal. Thus the data processing unit 46 processes the data component of the 20th horizontal scan signal on the basis of the predetermining reference level, the first counting signal and the checking signal.

Afterward, when the counting unit 50 counts the 283th horizontal scan signal, the counting unit 50 will transmit a second counting signal to the reference level processing unit 30. After receiving the second counting signal, the reference level processing unit 30 processes reference component of the 283th horizontal scan signal to generate a second reference level. On the other hands, the checking unit 43 checks the reference component of the 283th horizontal scan signal to determine the type of the 283th horizontal scan signal and generate a corresponding checking signal in accordance with the first reference level generated by the reference level processing unit 30. For example, the checking unit 43 checks whether the 283th horizontal scan signal is the CGMS signal 10. Next, the data processing unit 46 processes the data component of the 283th horizontal scan signal on the basis of the second counting signal, the checking signal from the checking unit 43 and the first reference level from the reference level processing unit 30.

Furthermore, the second reference level generated by the reference level processing unit 30 according to the 283th horizontal scan signal is used by the checking unit 43 to check type of the next horizontal scan signal (such as the 20th horizontal scan signal of the next frame). Similarly, the second reference level is also provided to the data processing unit 46 to process the data component of the next specific horizontal scan signal. In summary, before the generation of the second counting signal, the checking unit 43 as well as the data processing unit 46 uses the predetermining reference level to make checking and taking process. The afterward process is similar to the following description. The reference level processing unit 30 generates a N+1th reference level according to the reference component of the N+1th horizontal scan signal. The checking unit 43 checks the reference component of the N+1th horizontal scan signal in accordance with the Nth reference level so as to determine the type of the N+1th horizontal scan signal and generate the N+1th checking signal. And the data processing unit 46 processes the data component of the N+1th horizontal scan signal in accordance with the N+1th checking signal and the Nth reference level.

In addition, in order to make the reference level processing unit 30 to process the reference component (framing code 14) after the Color Burst 12, the counting unit 50 or other counting devices are used to count a plurality of reference clocks and then a notifying signal is sent to the reference level processing unit 30 so as to make the reference level processing unit 30 begins to process the reference component of the horizontal scan signal.

In summary, a data recovery device and a method thereof in accordance with the present invention are applied to process a television signal having a plurality of horizontal scan signals. The present invention takes advantage of the Nth reference component to get the Nth reference level. Then the Nth reference level is applied to check the type of the N+1th horizontal scan signal for taking a corresponding process.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data recovery device for processing a television signal having a plurality of horizontal scan signals comprising:
a reference level processing unit for generating a plurality of reference levels according to the plurality of horizontal scan signals, wherein each reference level is respectively corresponding to a reference component of each horizontal scan signal;
a checking unit checking the reference component of the N+1th horizontal scan signal according to the reference level of the Nth horizontal scan signal to determine the type of the N+1th horizontal scan signal and generate the N+1th checking signal; and
a data processing unit for processing a data component of the N+1th horizontal scan signal according to the N+1th checking signal; wherein the N is an integer.

2. The device as claimed in claim 1, wherein the checking unit checks whether the N+1th horizontal scan signal is a Vertical Blanking Interval signal according to the reference level of Nth horizontal scan signal.

3. The device as claimed in claim 2, wherein the checking unit checks whether the N+1th horizontal scan signal corresponds to a Vertical Blanking Interval type.

4. The device as claimed in claim 3, wherein the Vertical Blanking Interval type is Closed Caption, Video Programming System, Widescreen Signaling, Copy Generation Management System or Teletext.

5. The device as claimed in claim 1, wherein the reference component is a framing code or a Clock Run-In signal.

6. The device as claimed in claim 1, wherein the device further comprising:
an analog-to-digital converting unit for digitalizing the horizontal scan signals;
wherein the reference level processing unit generates the reference levels according to the digitalized horizontal scan signals.

7. The device as claimed in claim 1, wherein the reference level processing unit is an averaging filter.

8. A data recovery method for processing a television signal having a plurality of horizontal scan signals comprising:
generating a plurality of reference levels sequentially according to a reference component of each of the horizontal scan signals;
checking the reference component of the N+1th horizontal scan signal according to a reference level of the Nth horizontal scan signal to determine the type of the N+1th horizontal scan signal and generate the N+1th checking signal; and
processing a data component of the N+1th horizontal scan signal according to the N+1th checking signal;
wherein the N is an integer.

9. The method as claimed in claim 8, wherein the step of generating the N+1th checking signal comprising:
checking whether the N+1th horizontal scan signal is a Vertical Blanking Interval signal according to the reference level of Nth horizontal scan signal to generate the N+1th checking signal.

10. The method as claimed in claim 9, wherein the step of generating the N+1th checking signal further comprising:
checking whether the N+1th horizontal scan signal corresponds to a Vertical Blanking Interval type.

11. The method as claimed in claim 8, wherein the step of generating the N+1th checking signal further comprising:
determining a digital value of the reference component of the N+1th horizontal scan signal according to the Nth reference level; and
checking the type of the N+1th horizontal scan signal according to the digital value to generate the N+1th checking signal.

12. The method as claimed in claim 8, wherein the reference component is framing code or a Clock Run-In Signal.

13. The method as claimed in claim 8, wherein the method further comprising:
digitalizing the horizontal scan signals so as to generate the plurality of reference levels sequentially according to the reference component of each of the digitalized horizontal scan signals.

14. The method as claimed in claim 8, wherein the method further comprising:
counting the horizontal scan signals to generate a plurality of counting signals respectively, and processing the horizontal scan signals according to the counting signals.

15. The method as claimed in claim 14, wherein the horizontal scan signals correspond to at least a predetermining number that corresponds to at least one Vertical Blanking Interval (VBI) type.

16. A data recovery method for processing a television signal comprising:
receiving a first horizontal scan signal and second horizontal scan signal of the television signal;
generating a first reference level according to a reference component of the first horizontal scan signal;
determining the type of the second horizontal scan signal according to the first reference level;
generating a checking signal corresponding to the type of the second horizontal scan signal according to the first reference level; and
processing the second horizontal scan signal according to the checking signal.

17. The method as claimed in claim 16, further comprising:
determining whether the second horizontal scan signal corresponds to a Vertical Blanking Interval (VBI) signal or not.

18. The method as claimed in claim 17, wherein the Vertical Blanking Interval type is Closed Caption, Video Programming System, Widescreen Signaling, Copy Generation Management System or Teletext.

19. The method as claimed in claim 16, wherein the reference component is a framing code or a Clock Run-In signal.

20. The method as claimed in claim 16, wherein the first horizontal scan signal and second horizontal scan signal are digital horizontal scan signal.

* * * * *